United States Patent
Son et al.

[11] Patent Number: 5,961,675
[45] Date of Patent: Oct. 5, 1999

[54] HIGH EFFICIENCY COMPACT CYBAGFILTER

[75] Inventors: Jae-Ik Son; Young-Ok Park; Cheol-Oh Koo; Jeong-Hwan Lim; Hong-Yong Kim; Sang-Do Kim, all of Daejeon-Si; Tae-Hee Chun; Hyock-Ju Kwon, both of Kyungki-Do, all of Rep. of Korea

[73] Assignee: Korea Institute of Energy Research, Daejeon-Si, Rep. of Korea

[21] Appl. No.: 09/083,119

[22] Filed: May 22, 1998

[30] Foreign Application Priority Data

Mar. 25, 1998 [KR] Rep. of Korea .................. 98-10244

[51] Int. Cl.⁶ ............................................ B01D 46/04
[52] U.S. Cl. .............................. 55/307; 55/308; 55/331; 55/337; 55/456
[58] Field of Search ..................... 55/307, 308, 331, 55/337, 456, 462, 465

[56] References Cited

U.S. PATENT DOCUMENTS

| | | | |
|---|---|---|---|
| 1,970,488 | 8/1934 | Butts | 55/307 |
| 4,639,260 | 1/1987 | Borow | 55/331 |
| 5,307,538 | 5/1994 | Rench et al. | 55/337 |

FOREIGN PATENT DOCUMENTS

| | | |
|---|---|---|
| 708415 | 7/1941 | Germany . |
| 435067 | 5/1948 | Italy . |
| 7904622 | 12/1980 | Netherlands . |
| 0780862 | 11/1980 | Russian Federation . |
| 0971427 | 11/1982 | Russian Federation . |
| 511604 | 1/1938 | United Kingdom . |

Primary Examiner—Jay H. Woo
Assistant Examiner—Minh-Chau T. Pham
Attorney, Agent, or Firm—Nikaido Marmelstein Murray & Oram, LLP

[57] ABSTRACT

A high efficiency compact gas-particulate separator is provided comprising: a bag filter disposed above and a cyclone disposed below, the bag filter including: a casing, a compressed air header into the casing; a diaphragm valve on the header; a blow tube connected to the header; a venturi for accelerating an ejected jet of compressed air from the blow tube and for inducing an inflow of secondary air; and a filter bag for collecting dusts mounted in the casing; the casing having a clean air outlet, and the cyclone including: a dust-laden gas inlet; an outer cylinder for generating a centrifugal force, the cylinder being connected to the casing; an inner tube for letting a dust-laden gas pass from below upward into the casing; and a dust hopper for storing dust particles captured by centrifugal forces and dislodged dust cakes removed from the filter bag by cleaning.

5 Claims, 5 Drawing Sheets

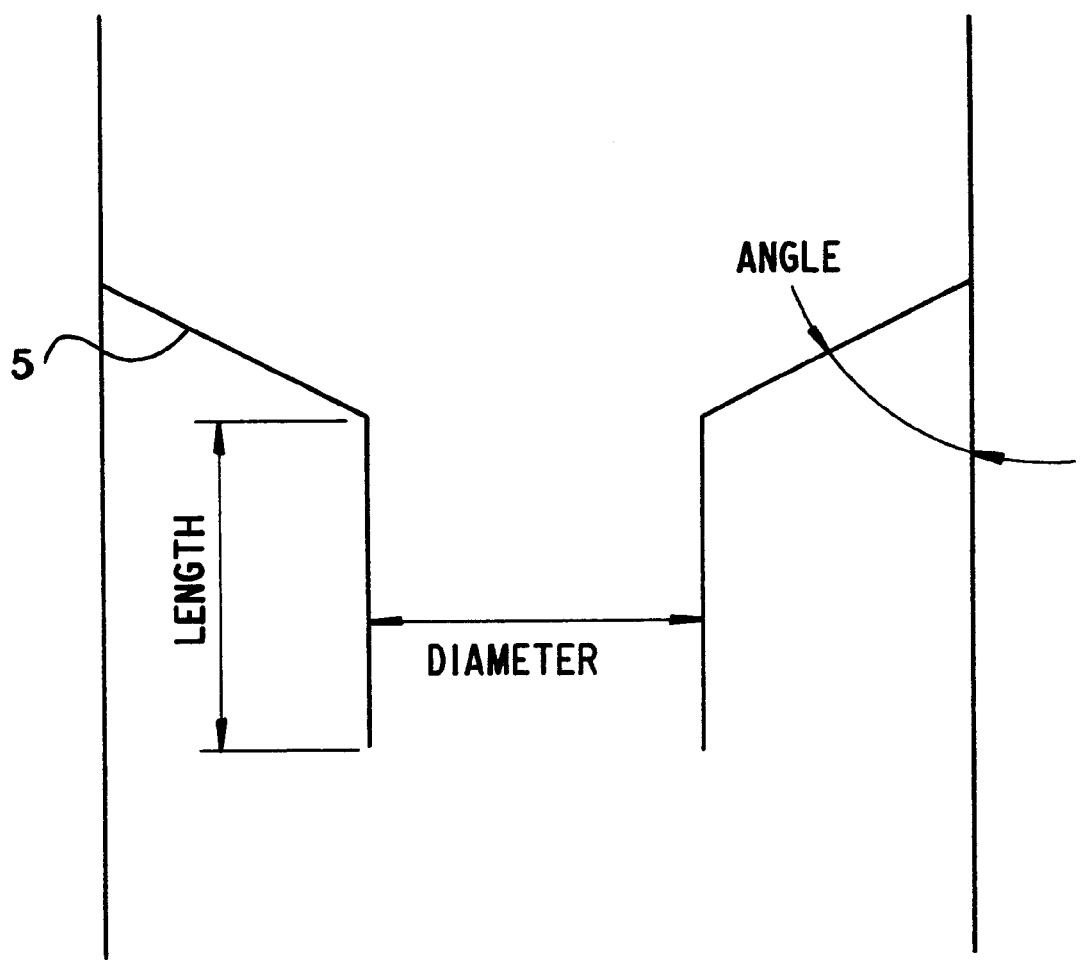

HIGH EFFICIENCY COMPACT CYBAGFILTER

BACKGROUND OF THE INVENTION

1. Field of the Invention

The present invention relates to a high efficiency compact apparatus, available commercially under the trademark combined cyclone and bag filter apparatus, available commercially under the trademark CYBAGFILTER. Particularly the present invention relates to an integral high efficiency compact combined cyclone and bag filter gas-particulate separator apparatus CYBAGFILTER, in which dusts are captured in industrial dust discharging processes such as heavy oil combustion processes, waste incinerating processes, cement manufacturing processes and the like. For this purpose, first, the incoming dust particles are collected based on the centrifugal force principle, and the residual fine dust particles are captured by means of a filter bag disposed above. These two kinds of dust collecting principles are combined into one integral apparatus.

2. Description of the Prior Art

Among dust control equipment, the bag filter is known to control fine dust particles of 0.01 μm by more than 95%.

However, whereas it has high performance, it also has several disadvantages. That is, as the dust capturing operation proceeds, the dust cake on the filter bag surface becomes thick, and therefore, the pressure drop becomes high, with the result that a normal operation becomes impossible.

Therefore, cleaning operations have to be carried out periodically, that is, the dust cake accumulated on the filter bag surface has to be discharged.

The cleaning operation is carried out in such a manner that mechanical force or a strong dynamic energy is applied to remove the accumulated dust cake from the surface of filter bag. However, if the dust concentration at the inlet is high, or if the filtration velocity(air-to-cloth ratio) is high, or if the dust cake is intractable to the cleaning operation, in order to efficiency conduct a bag filter operation, the cleaning operation has to be carried out more frequently, or a large amount of high pressure jet of air has to be injected into the top of the filter bag.

When such a strong cleaning operation is carried out, the pore size of the filter bag becomes large. Then dust particles pass through enlarged pores of the filter bag, with the result that the dust collection efficiency is lowered. Further, due to the short interval of cleaning operations, erosions occur between the filter bag and the bag cage, with the result that the filter bag is worn out and damaged, thereby shortening the filter bag life.

Furthermore, if the filtration velocity is designed to be fast, although the size of the bag filter becomes small, the pressure drop is drastically increased. Therefore, a low filtration velocity has to be applied inevitably.

If the dust loading is high on the bag filters, the pressure drop is drastically increased. Therefore, in order to reduce the dust loading, a cyclone is installed upstream of the bag filter, so that the coarse dust particles can be collected first, thereby reducing the dust loading on the bag filters.

However, upstream cyclone is low in the collection efficiency, and, due to the carelessness in its operation and maintenance, the reality is that the cyclone is not properly utilized.

Furthermore, in order to efficiently collect dusts discharged from the industrial process, pre-dust collectors and final dust collectors (bag filters, etc) have to be installed.

Accordingly, in the domestic industries, the installation costs are high due to installation of the two units of dust control equipment. Further, the installation area has to be large, and more manpower is required to operate the two units of the dust control equipment. This has been the reality so far.

FIG. 5 illustrates the conventional industrial dust control equipment. In this equipment, a cyclone and a bag filter are separately installed.

The design standard for the cyclone separators is such that the standard model is adopted. That is, it is the one that is proposed by Lapple, Swift or Stairmand. In this design, the height and the width of the inlet, and the diameter and height of the outlet, and the overall height were decided based on the diameter of the main body of the cyclone separators.

In the conventional cyclone separators, the dust-laden gas flow is formed from above in a tangential direction. Thus a vortex is formed to descend along the wall (forming a first vortex). Then the vortex is reversed at a lower tip of a conical vessel to then ascend (forming a second vortex).

Reference code A in FIG. 5 indicates a dust-laden gas inlet, B indicates a cyclone separator, C indicates a rotary valve, D indicates a bag filter, E indicates a manometer, F indicates a diaphragm valve, G indicates a timer, H indicates a compressed air header, and I indicates a clean air outlet.

Therefore, a combined type dust control equipment is in demand in which a single unit serves the prior dust collecting functions of the two units of the dust control equipment, and in which the required installation area is small, and the installation cost is low.

The worldwide trend of the development of the dust control equipment will be described below.

That is, there is a limit in the conventional double-unit dust control equipment, and therefore, a compact hybrid bag filter is under development in which the conventional two units are merged together.

Examples of the apparatus in which the principle of the cyclone and the principle of the bag filter are merged are Simartek's Vetyton Jet Air Filter of Denmark, Multizyklone's Turbofilter of Germany, and Krantz-Tkt's AS filter of Germany.

In the Simartek's Vetyton Jet Air Filter of Denmark, a dust-laden gas flow which is incoming from above spins and descends, so that coarse dust particles are captured, and fine dust particles are transferred to a filter bag disposed above, so as to be collected. In this apparatus, the structure is dual, and the installation cost is high.

In the Multizyklone's Turbofilter of Germany, a filter bag is combined to a multiclone. In an incoming flow the dust particles in the dust-laden gas are first collected by the multiclone, and the uncollected dust particles at the multiclone are further collected by the filter bag. In this apparatus also, the structure is complicated, and efficient operation is impossible. Further, the installation cost is high, and the filtering operation and the cleaning operation have to be separately carried out.

In the Krantz-Tkt's AS filter of Germany, coarse dust particles are removed by a cyclone disposed below, and fine dust particles are filtered by a filter bag disposed above. In this apparatus, the shape of the filter bag is rectangular, and a cleaning device is installed right above. Therefore, the replacement of the filter bag is difficult. Further, a clean air sucking device (i.e., a fan) is installed above, and therefore, the construction of large scale equipment is impossible.

SUMMARY OF THE INVENTION

The present invention is intended to overcome the above described disadvantages of the conventional techniques.

Therefore it is an object of the present invention to provide a new high efficiency compact CYBAGFILTER in which the operation and maintenance are simple and convenient, the dust loading imposed on the filter bag is maintained to the minimum, cleaning interval is extended to 100 times, the high efficiency dust removal operation is carried out by a low pressure jet of air to reduce the overall pressure loss, the dust collection efficiency is improved, the dust loading on the filter bag is reduced, the shapes of the inlet and inner tube are so designed as to extend the filter bag life by 2–3 times compared with the conventional ones to provide an optimum shape and an optimum structure, and the installation space is reduced by combining the principle of the cyclone and the bag filter technique.

In achieving the above object, the high efficiency compact dust control equipment according to the present invention integrally includes a bag filter disposed above and a cyclone disposed below. The bag filter includes: a compressed air header; a diaphragm valve; a blow tube; a venturi for accelerating an ejected jet of compressed air and for inducing an inflow of a secondary air; a filter bag for collecting dusts; and a clean air outlet. The cyclone includes: a dirty air inlet; an outer cylinder for generating a centrifugal force; an inner tube for passing the dust-laden gas from below upward; and a dust hopper for storing the dust particles collected by centrifugal forces and dislodged dust cakes removed by cleaning.

BRIEF DESCRIPTION OF THE DRAWINGS

The above object and other advantages of the present invention will become more apparent by describing in detail the preferred embodiment of the present invention with reference to the attached drawings in which:

FIG. 3 illustrates the inner tube according to the present invention;

DETAILED DESCRIPTION OF THE PREFERRED EMBODIMENT

Figure 5:
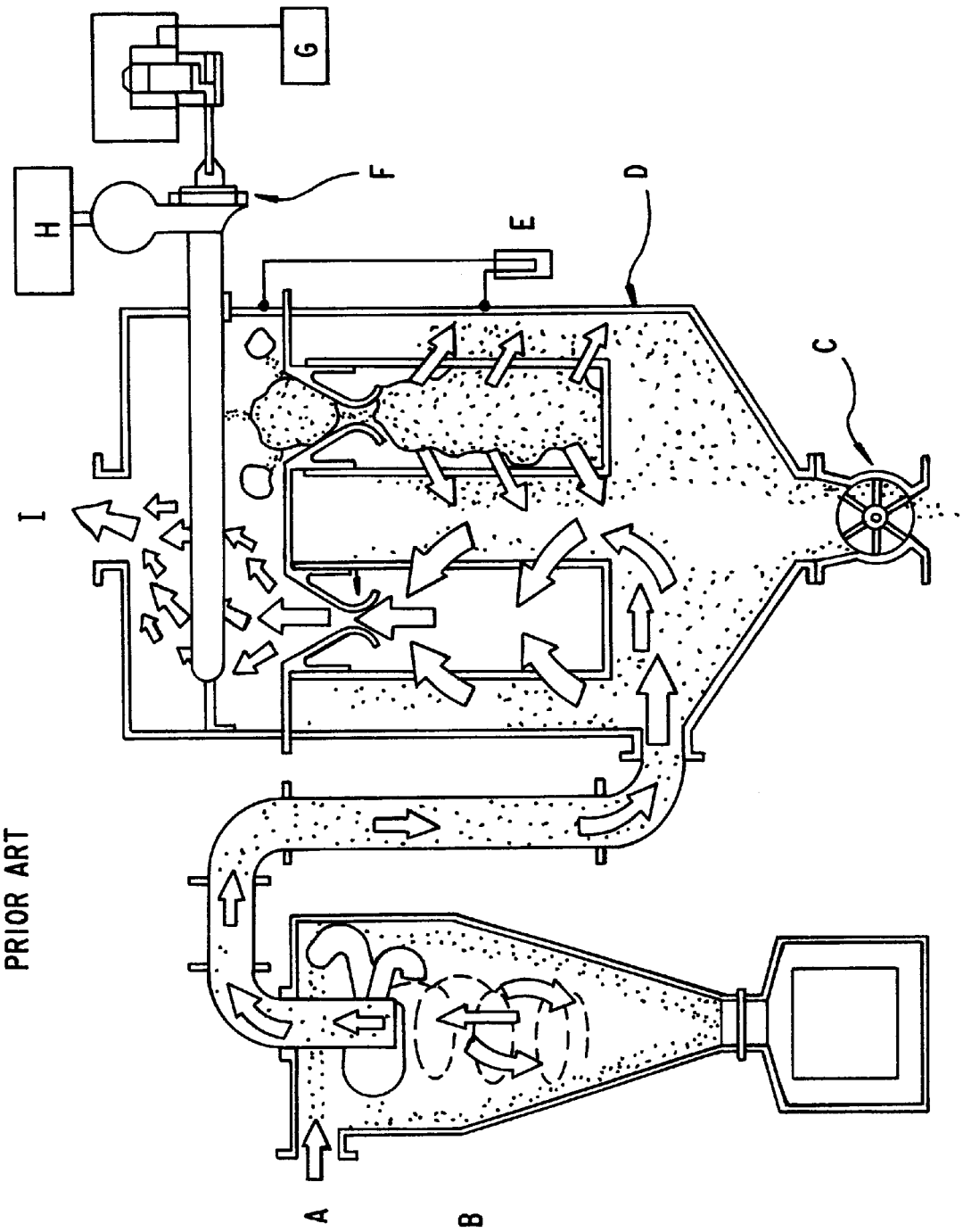
FIG. 5 is a schematic view of the conventional dust control equipments.

The preferred embodiment of the present invention will be described referring to the attached drawings, and comparatively referring to FIG. 5.

Figure 1:
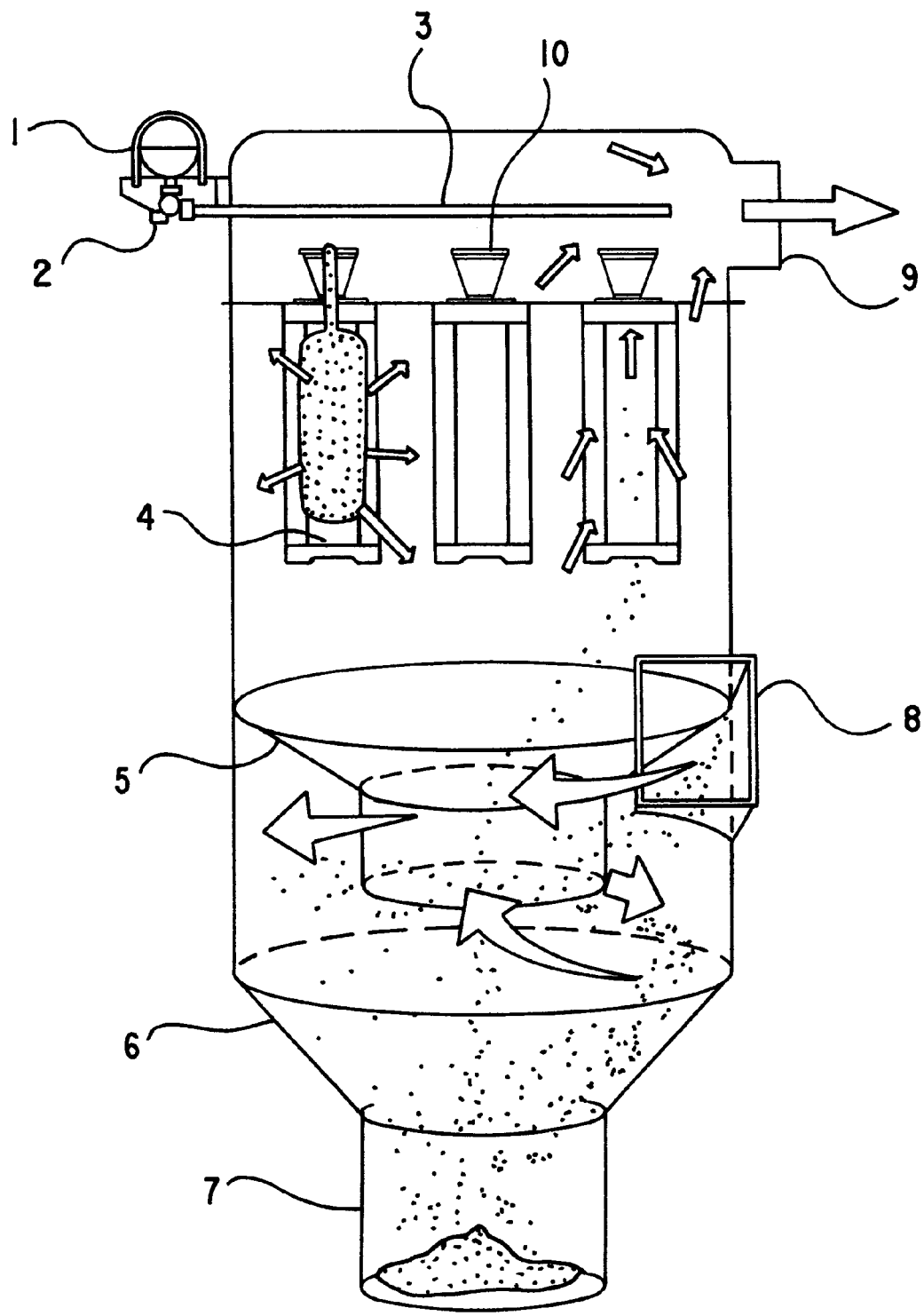
FIG. 1 is a schematic illustration of the high efficiency compact CYBAGFILTER according to the present invention.

As shown in FIG. 1, the high efficiency compact CYBAGFILTER according to the present invention integrally includes a bag filter disposed above and a cyclone disposed below.

The bag filter includes: a compressed air header 1; a diaphragm valve 2; a blow tube 3; a venturi 10 for accelerating an ejected jet of compressed air and for inducing an inflow of a secondary air; a filter bag 4 for collecting dusts; and a clean gas outlet 9.

The cyclone includes: a dust-laden gas inlet 8; an outer cylinder 6 for generating a centrifugal force; an inner tube 5 for passing the dust-laden gas from below upward; and a dust hopper 7 for collecting and storing the dust particles collected by centrifugal forces and dislodged dust cakes removed by cleaning.

The outer cylinder 6 has the same size as that of the bag filter disposed above, so that the bag filter disposed above can be easily coupled to the cyclone disposed below unlike the conventional dual equipments. Furthermore, the inner tube 5 is unitizingly coupled so that the scale of the apparatus can be minimized, and that the formation of a vortex of the dust-laden gas can be made brisk.

Therefore, in the present invention, the occupation space can be reduced to a great degree. Furthermore, owing to the compactness of the size, the installation costs of more than 30% can be saved.

Furthermore, in the present invention, the bag filter is integrally connected, and therefore a special structure is adopted unlike the conventional ones. That is, there is designed an integral compact CYBAGFILTER in which an optimum non-standard cyclone is adopted based on repeated pilot experiments and on the interpretation of the flow fields.

Figure 2:
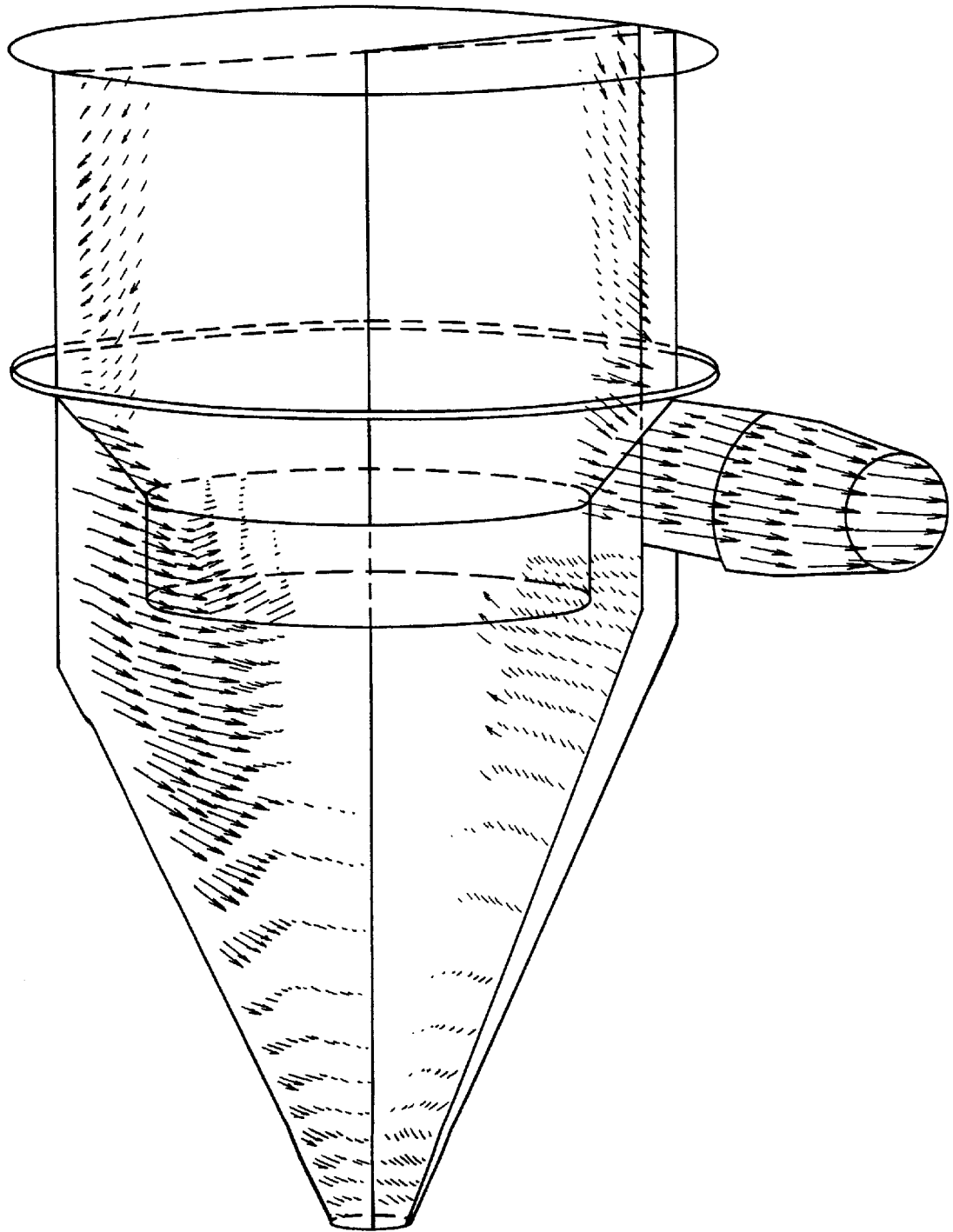
FIG. 2 is an interpretation of the flow field of the high efficiency compact CYBAGFILTER according to the present invention.
Figure 4A:
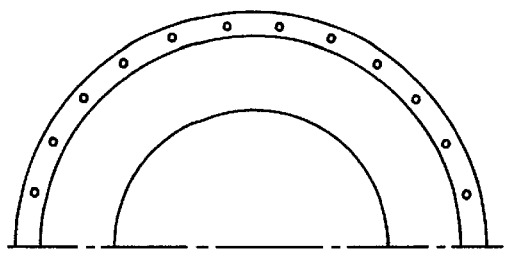
FIG. 4 schematically illustrates the shape of the inlet according to the present invention.
Figure 4B:
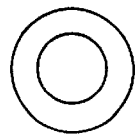
Figure 4C:
Figure 4D:
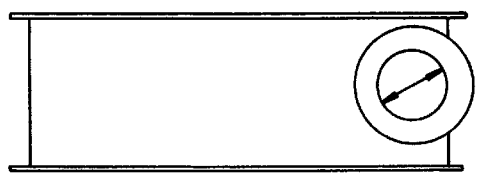
Figure 4E:
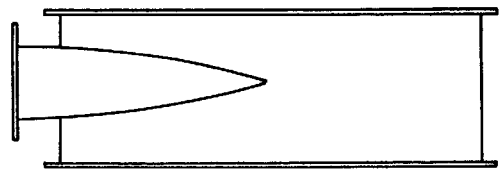
Figure 4F:
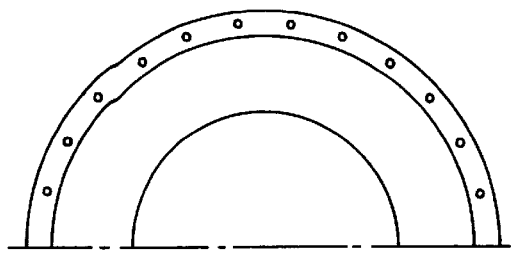
Figure 4G:
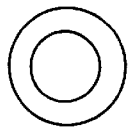
Figure 4H:
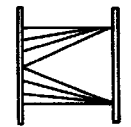
Figure 4I:
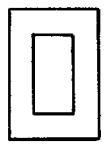
Figure 4J:
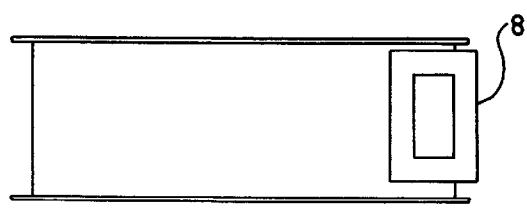
Figure 4K:
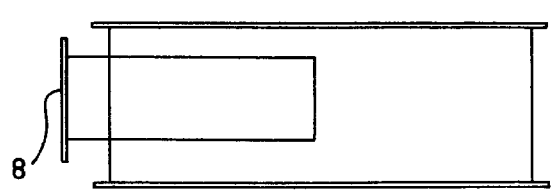

FIG. 2 is an interpretation of the flow fields of the high efficiency compact CYBAGFILTER according to the present invention. The incoming dusts form a vortex like in conventional equipment, and the dusts are collected on the wall of the outer cylinder 6, and the residual dusts ascend. This is same as the principle of the conventional equipments.

However, in the present invention unlike the conventional equipment, the incoming dust particles form a first vortex along the wall of the outer cylinder 6, and at the same time, the incoming dust particles ascend along the wall of the inner tube 5 to form a second vortex.

Furthermore, the dust-laden gas which has ascended upward reverses its flow direction downward to form a third vortex.

Furthermore it was confirmed through experiments that the ascending dust particles do not collide with the sinking dust particles and with the dust cakes removed from the filter bag by cleaning.

The dust-laden gas which flows upward from the cyclone forms a uniform flow stream to be dispersed toward the lower portion of the filter bag, owing to the fact that the upper portion of the inner tube 5 is conical.

This technical principle is based on a structure in which the bag filter has the same size as that of the outer cylinder 6.

FIG. 3 illustrates the inner tube length, the inner tube diameter, and the inner tube angle. These dimensions influence the dust collection efficiency and the pressure drop. The dimensional data of the present invention were decided based on the result of the interpretation of the flow field which represents the flow of the dust particles within the experimental equipment. The experimental equipment has a main body diameter of 873 mm, an inner tube length of 150 mm, an inner tube diameter of 500–560 mm, and an inner tube angle of 46°–52°.

As shown in FIG. 4, the dust-laden gas inlet 8 basically influences the flow velocity of the incoming dust-laden gas. Therefore the inlet 8 has a rectangular cross section, so that the pressure drop of the dust-laden gas can be reduced to the maximum degree, the contact of the dust particles onto the wall of the outer cylinder 6 can be smooth to improve the dust collection efficiency, and the formation of the stream within the equipment can be made stable.

In the present invention, compared with conventional equipment, the amount of dust accumulated in the bag filter is extremely small. Therefore, the pressure drop is lower by about 30%, and the life of the filter bag can be extended by as much as 2–3 times, while the outlet dust concentration is maintained to below 10 mg/cm$^3$. All the above data were confirmed by field experiments.

According to the present invention as described above, an integral compact CYBAGFILTER is provided in which a bag filter and a cyclone are combined together into a special structure. The operation and maintenance are simple, and the size of the apparatus is small, so that the apparatus can be installed in a narrow area. In accordance with the installation space, modifications of the structure are possible, and the dust collection efficiency is excellent compared with conventional equipments. The pressure drop is markedly low, and the dust loading imposed on the filter bag is decreased, while the life of the filter bag is extended.

Further, in the integral compact CYBAGFILTER of the present invention, the rising dust-laden gas does not give an adverse effect to the dust particles from the filter bag.

What is claimed is:

1. A high efficiency compact gas-particulate separator integrally comprising: a bag filter disposed above and a cyclone disposed below, said bag filter comprising: a casing, a compressed air header into said casing; a diaphragm valve on said header; a blow tube connected to said header; a venturi for accelerating an ejected jet of compressed air from said blow tube and for inducing an inflow of secondary air; and a filter bag for collecting dusts mounted in said casing; said casing having a clean air outlet, said cyclone comprising: a dust-laden gas inlet; an outer cylinder for generating a centrifugal force, said cylinder being connected to said casing; an inner tube for letting a dust-laden gas pass from below upward into said casing; and a dust hopper for storing dust particles captured by centrifugal forces and dislodged dust cakes removed from said filter bag by cleaning.

2. The separator as claimed in claim 1, wherein said dust-laden gas inlet has a rectangular cross section which enables smooth laminar flow along the outermost wall of the rectangular inlet directly blending into the inner surface of the cylindrical wall of the outer cylinder, thereby maximally reducing the pressure drop of the dust-laden gas so that the dust-laden gas forms a stream within the apparatus which is stable.

3. The separator as claimed in claim 1, wherein said outer cylinder has a size which is the same as that of said casing of said bag filter disposed above and said outer cylinder is so shaped as to make the size of the apparatus minimized, and to achieve a brisk formation of an initial vortex of the dust-laden gas.

4. The separator as claimed in claim 1, wherein said inner tube is sized to maintain a low pressure drop and said cyclone has dimensions of: a main body diameter of 873 mm, an inner tube length of 150 mm, an inner tube diameter of 500–560 mm, and an inner tube of angle of 46°–52° so as to make the rising stream evenly distributed to a lower portion of said filter bag.

5. The separator as claimed in claim 1 or 4, wherein said inner tube has a conical upper portion so as to make the dust-laden gas uniformly dispersed toward said filter bag.

* * * * *